United States Patent
Luczak

[11] 3,840,694
[45] Oct. 8, 1974

[54] CABLE WITH STRIPABLE INSULATION

[75] Inventor: Joseph John Luczak, Montreal, Quebec, Canada

[73] Assignee: Union Carbide Canada Limited, Toronto, Ontario, Canada

[22] Filed: June 26, 1973

[21] Appl. No.: 373,832

[30] Foreign Application Priority Data
June 26, 1972 Canada.............................. 145642

[52] U.S. Cl................ 174/120 SR, 117/6, 117/232, 174/110 P
[51] Int. Cl. ........................................... H01b 7/02
[58] Field of search... 174/120 R, 120 SR, 174/110 P 117/6, 117/232

[56] References Cited
UNITED STATES PATENTS
3,484,540   12/1969   Wilson............................ 174/120 R Primary Examiner—E. A. Goldberg

[57] ABSTRACT

Electrical conductors having vulcanized ethylene polymer insulation are described wherein new and improved release agents are coated on the conductor to assist in the removal of the insulation. The release agents are certain polymers of ethylene oxide such as polyethylene oxide and copolymers of ethylene oxide and propylene oxide.

8 Claims, 1 Drawing Figure

PATENTED OCT 8 1974 3,840,694
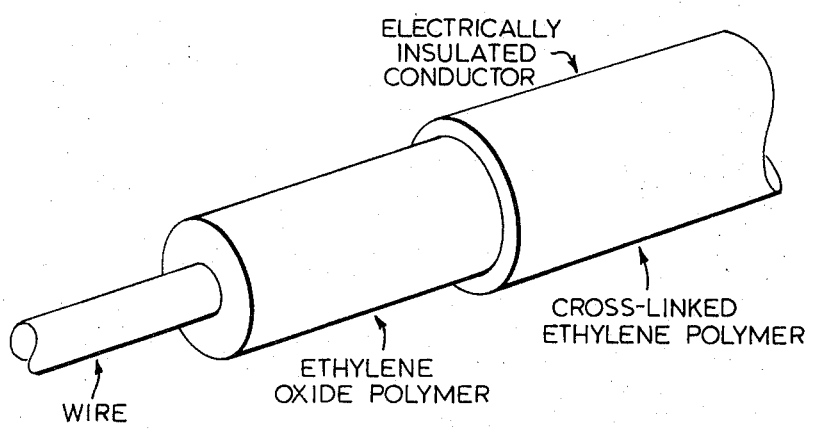
William G. Hopley

CABLE WITH STRIPABLE INSULATION

BACKGROUND OF THE INVENTION

1. Field of the Invention

This invention relates to the production of electrical conductors having vulcanized ethylene polymer insulation thereon. More particularly, it relates to an improvement in which certain release agents are placed between the wire and the vulcanized ethylene polymer insulation.

2. Description of the Prior Art

The use of vulcanized or cross-linked ethylene polymers as electrical insulation on wire and cable is well known in the art. Such cross-linked ethylene polymers can be prepared by admixing certain cross linking agents with low density ethylene polymer. The resulting ethylene polymer based compositions are thermoplastic and can be melt extruded onto a wire or cable and then heated to a temperature of 80°–190°C. The cross-linking agent in the ethylene polymer based composition is thereby activated and the ethylene polymer is cross-linked or vulcanized and adopts many of the characteristics of a thermosetting resin. Certain peroxides such as dicumyl peroxide or alpha, alpha, bis(t-butyl peroxy)diisopropylbenzene are known as effective cross-linking agents for this purpose. Insulated wire or cable can thereby be easily produced by extruding the ethylene polymer based composition onto the wire or other article to be insulated and cross-linking the resin directly thereon. Because of its good electrical insulation properties, as well as its ability to withstand deformation at temperatures of 300°C or higher, such insulation is commercially desirable. It is also easy to extrude onto the wire prior to cross-linking.

During the cross-linking step the ethylene polymer is in intimate contact with the wire. The chemical reaction in the ethylene polymer during the cross-linking reaction, as well as the intimacy of contact between the resulting vulcanized ethylene polymer and the wire conductor, causes a high level of chemical and mechanical adhesion between the vulcanized ethylene polymer and the wire. It has also been found that such adhesion increases during the storage life of such insulated wire.

A good contact between the vulcanized ethylene polymer and the wire is desirable from an electrical point of view, but when portions of vulcanized ethylene polymer have to be subsequently removed for splicing sections of wire, such adhesion makes handling difficult, particularly in the field where the installer is limited in his freedom of movement and by the extent of equipment available.

In order to make such vulcanized ethylene polymer easy to remove from the insulated wire, one method presently used in the art is to apply a Milar or cellophane tape on to the wire prior to the extrusion coating thereof with the ethylene polymer. This of course is expensive and inconvenient since the tape must be wound around the wire prior to the ethylene polymer coating operation and also because additional material must be removed by the installer at the time of splicing.

In order to overcome these difficulties, attempts have also been made in the prior art to coat the wire with a release agent prior to the extrusion coating with the ethylene polymer. Certain silicone release agents have been used for this purpose such as the one having the formula:

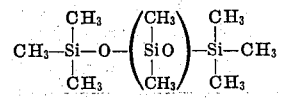

Such silicone compounds are relatively expensive and therefore substantially increase the cost of producing the insulated wire.

These silicone release agents also have certain other technical disadvantages such as relatively poor peel strength properties for their intended function as release agents.

SUMMARY OF THE INVENTION

The present applicant has found that certain ethylene oxide polymers can be used as release agents to facilitate the removal of ethylene polymer based insulation from electrical conductors. These release agents are relatively inexpensive and provide technical advantages which are not provided by the prior art silicone release agents.

It is therefore an object of this invention to provide a vulcanized ethylene polymer insulated wire having improved release characteristics.

It is another object of this invention to provide a process for producing a wire having cross-linked ethylene polymer insulation thereon which includes the step of coating the wire with certain improved release agents prior to coating with the cross-linkable ethylene polymer.

DESCRIPTION OF THE DRAWING

The FIGURE of the drawing illustrates an insulated cable of the type in which the applicant's release agent can be used.

DESCRIPTION OF THE PREFERRED EMBODIMENT

It has now been found that the objects of the present invention can be achieved by using certain ethylene oxide polymers as release agents to facilitate the removal of the crosslinked ethylene polymer insulation from the electrical conductor insulated therewith.

ETHYLENE OXIDE POLYMER

The ethylene oxide polymer which is used in the present invention is a polymer which comprises at least 50 weight percent of interpolymerized ethylene oxide units, i.e., $-CH_2-CH_2-O-$. The ethylene oxide polymer may contain $\leq 50$ weight per cent of interpolymerized units having the structure $-R-O-$ wherein R is a $C_3$ to $C_6$ hydrocarbon radical such as propyl, butyl, pentyl, benzyl. The ethylene oxide polymers thus include homopolymers of ethylene oxide and propylene oxide as well as interpolymers of at least 50 weight percent of interpolymerized units of ethylene oxide and $\leq 50$ weight per cent of interpolymerized units of at least one of the $-R-O-$ units.

The $-CH_2-CH_2-O-$ and the $-R-O-$ units in the ethylene oxide polymers can be provided by homopolymerizing or interpolymerizing appropriate vicinal epoxides such as ethylene oxide, propylene oxide, butylene oxide and styrene oxide, or by homopolymerizing or interpolymerizing appropriate glycols such as ethylene glycol, propylene glycol, and butylene glycol.

The preferred ethylene oxide polymers for use in the present invention are those which have a molecular weight of about 10,000 to 30,000 and preferably of about 15,000 to 25,000. These preferred ethylene oxide polymers also have a viscosity at 100°F of 600 to 700 Saybolt seconds.

The ethylene oxide polymer is used to treat the surface of the electrical conductor so as to provide a substantially continuous layer of such polymer on the conductor which is at least monomolecular in depth. The ethylene oxide polymers can be used individually or in combinations of each other.

CROSSLINKABLE ETHYLENE POLYMER

The crosslinkable ethylene polymers which are to be used as the base resin for the insulation compositions of the present invention are resins having a density of about 0.915 to 0.945, and preferably of about 0.930 to 0.935 grams/cc. (as per ASTM D–1505). These resins have a melt index of about 1.0 to 25.0 grams per 10 minutes (as per ASTM test procedure D–1238).

These ethylene polymers include homopolymers of ethylene, and interpolymers of at least 3 percent weight percent of ethylene and up to 25 percent weight percent of at least one other vinyl monomer, i.e., those containing at least one polymerizable group of the structure

Such vinyl monomers would include vinyl acetate, alkyl acrylate and methacrylates such as ethyl acrylate, butyl acrylate and methyl methacrylate.

The preferred interpolymers are those containing about 80 to 95 weight of ethylene and about 5 to 20 weight percent of vinyl acetate or ethyl acrylate.

The ethylene polymers can be used individually or in combination with one another. Where a blend of such ethylene polymers is used, an individual polymer may contain 2 to 25 weight percent of interpolymerized monomer other than ethylene, as long as the interpolymerized ethylene content of the blend of the polymers is about 75 to 98 weight percent.

CROSSLINKING AGENT

The crosslinking agent may be a peroxide compound such as dicumyl peroxide or alpha,alpha,bis(t-butyl peroxy)diisopropyl.

The preferred peroxide crosslinking agents are those which have a decomposition temperature of $\geq$ 150°C. The peroxides may be used individually or in various combinations thereof.

About 1.0 to 3.0 parts by weight of the peroxide is used per 100 parts by weight of the ethylene polymer.

The ethylene polymer may also be crosslinked or vulcanized by the use of electron beam radiation. The amount of radiation used for this purpose is of the order of about 5 to 25 mega reps.

The crosslinking of the ethylene polymer with the peroxide crosslinking agents is usually conducted at temperatures of about 300°F to 350°F and when using irradiation, the temperature is about 23°C to 150°C.

ADJUVANTS

In addition to the ethylene polymers and the crosslinking agent the insulation compositions advantageously may include a lubricant to facilitate extrusion of the composition and a suitable high temperature anti-oxidant.

Suitable lubricants include fatty acids such as stearic acid, esters and semi-esters of such acids, mineral oils and natural and synthetic waxes. The best results are obtained using 13-docosenamide. Typically, the lubricant is present in amounts of between 0.001 to about 1, preferably between about 0.02 and about 0.05, parts by weight per 100 parts by weight of the ethylene polymer component of the insulation composition.

Suitable anti-oxidants for use in the insulation compositions of this invention include di-butyl-p. -cresol and other commercially available materials such as Topanol C.A., Santonox and Nonox W.S.P. These materials are chemically, 1,1,3-tris(2-methyl-4-hydroxy-5-tertiary butyl phenyl)butane, 4,4'-thiobis-6-tertiary butyl meta cresol and 2,2'-methylene-bis 6-(1-methyl cyclohexyl)-4-methyl phenol respectively.

Other additives may be included in the insulation compositions such as, for example, filler, extenders, pigments or other coloring matter, modifiers and opacifiers.

The adjuvants or additives selected for use in each case are those which are normally employed with the particular type of insulation composition being used. The adjuvants would be used in amounts which would be effective for the intended purpose. Thus, stabilizers would be used in a stbilizingly effective quantity and fillers would be used in effective quantities therefor. For example, if a reinforcing filler were to be used, such filler would be used in such amounts as to provide the desired reinforcing effect.

PROCESSING

The ethylene polymer(s) and the cross-linking agent (when used), as well as any other desired constituents of the insulation compositions, may be blended together by any of the techniques used in the art to blend and compound thermoplastics to homogeneous masses. For instance, the components may be fluxed on a variety of apparatus including multi-roll mills, screw mills, compounding extruders and Banbury mixers, or dissolved in mutual or compatible solvents.

When all the solid components of the insulation composition are available in the form of a powder, or as small particles, the compositions are most conveniently prepared by first making a blend of the components, say in a Banbury mixer or a continuous extruder, and then masticating this blend on a heated mill, for instance, a two-roll mill, and the milling continued until an intimate mixture of the components is obtained. Alternatively, a master batch containing the crosslinking agent (if used) and, if desired, some or all of the other components, may be added to the mass of ethylene polymer. Where the ethylene polymer is not available in powder form, the compositions may be made by introducing the ethylene polymer to the mill, masticating it until it forms a band around one roll, after which a blend of the remaining components is added and the milling continued until an intimate mixture is obtained. The rolls are preferably maintained at a temperature within the range 80°C to 150°C. The crosslinkable composition, in the form of a sheet, is removed from the mill and then brought into a form, typically dice-like pieces, suitable for subsequent processing.

The following examples are merely illustrative of the present invention and are not intended as a limitation upon the scope thereof.

EXAMPLE I a. A crosslinkable composition consisting of about 97.5 percent by weight of ethylene homopolymer having a density of 0.930 and approximately 2.5 percent by weight of dicumyl peroxide was extruded on to a number 14 AWG copper wire at approximately 127°C and vulcanized. The thickness of the resulting ethylene polymer based coating was 32 mils. This sample was allowed to cool and used for comparison purposes with similar samples having a release agent. The term AWG referred to herein means the American wire gauge as applied to non-ferrous conductors used in the Canadian Electrical Code.

b. A further sample of No. 14 AWG copper wire was passed through a bath of a release agent consisting mainly of a copolymer of ethylene oxide and propylene oxide, with the weight ratio of ethylene oxide and propylene oxide, with the weight ratio of ethylene oxide to propylene oxide being about 1/1. The liquid copolymer had a viscosity of 660 Saybolt seconds at 100°F. The excess liquid copolymer was removed with a cloth and the cross linkable composition described above was coated on to the wire (~ 32 mils) and the sample was vulcanized in a static chamber for 10 minutes at 200 psi steam pressure.

c. A similar sample of No. 14 AWG copper wire was coated with a release agent consisting mainly of a homopolymer of ethylene oxide having a molecular weight of from 570 to 630. The cross linkable composition described above was also coated (~ 32 mils) on this sample and vulcanized in the above manner.

d. A similar sample of No. 14 AWG copper wire was coated with a release agent consisting mainly of a copolymer of ethylene oxide and propylene oxide with the weight ratio of ethylene oxide to propylene oxide being about 3/1 and having a viscosity of 1,400 Saybolt Seconds at 100°F. The cross linkable composition described above was also coated (~ 32 mils) on this sample and vulcanized in the above manner.

e. A similar sample of No. 14 AWG copper wire was coated with a silicone release agent sold under the Union Carbide trade mark L-45 Silicone Fluid. This was also coated with the crosslinkable composition described above and subject to the above curing operation.

All five samples were then aged for 72 hours at 70°C. to simulate shelf storage conditions. The results may be summarized as follows:

| | SAMPLE | STRIPPING CHARACTERISTICS |
|---|---|---|
| (a) | No release agent | poor |
| (b) | Ethylene oxide/propylene oxide 1/1 ratio | excellent |
| (c) | Ethylene oxide polymer – mol wt 570–630 | good to excellent |
| (d) | Ethylene oxide/propylene oxide 3/1 ratio | fair |
| (e) | L-45 Silicone fluid | fair |

The sample having no release agent on the wire proved difficult to strip and the vulcanized insulation showed a tendency to stick to the wire even when cut free from the remainder of the coating. Considerable manual force was required to remove the coating and if such insulation had been much thicker than 32 mils it would have required a special stripping tool.

The sample containing the ethylene oxide/propylene oxide copolymer with the 1/1 ratio was easily removed and when the vulcanized insulation was cut around the edge of the wire the insulation released from the wire without effort.

The sample containing the homopolymer of ethylene oxide required slightly more manual effort for release of the insulation than did that containing the 1/1 copolymer. However, the release characteristics of this sample were still considered to be good compared to that of the sample containing the silicone.

The sample containing the silicone release agent showed considerably better release properties than the sample containing no release agent but some effort was required to remove the insulation from this sample of wire so that its release characteristics were not as good as those obtained from the homopolymer of ethylene oxide or the ethylene oxide/propylene oxide copolymer with the 1/1 ratio. In the case of cable containing thicker insulation this difference would be significant enough to be inconvenient to the cable installer.

The sample containing the ethylene oxide/propylene oxide copolymer with the 3/1 ratio achieved release characteristics as good as those obtained with the silicone compound. Since its cost is considerably less it has a definite advantage over silicone.

EXAMPLE II

A further crosslinkable composition consisting of a copolymer of ethylene-vinyl acetate containing from 10 percent to 12 percent by weight of vinyl acetate and approximately 2.5 percent by weight of dicumyl peroxide was extruded onto a No. 14 AWG copper wire under approximately the same conditions as set out in Example I. The sample was vulcanized in a static chamber for about 10 minutes at 200 psi steam pressure. This sample was used for comparison purposes with similar samples having various release agents coated on the wire.

Additional samples were prepared in which No. 14 AWG copper wire was coated with ethylene oxide/propylene copolymer having a weight ratio of ethylene oxide to propylene oxide of about 1/1, a sample coated with ethylene oxide homopolymer and a sample coated with ethylene oxide/propylene oxide copolymer having a weight ratio of ethylene oxide to propylene oxide of about 3/1. These samples were prepared in the manner set out in paragraphs (b)(c)(d) of Example I except that the vulcanized insulation was ethylene-vinyl acetate copolymer instead of polyethylene. A sample coated with an L-45 silicone release agent as described in paragraph (e) of Example I was also prepared and insulated with vulcanized ethylene-vinyl acetate copolymer.

The cross-linkable ethylene vinyl acetate copolymer composition as described above was vulcanized on each of the samples and the samples aged for 72 hours at 70°C to simulate storage conditions. The samples were removed and cooled to room temperature and the adhesion of the vulcanized copolymer to the conductor was noted by stripping three inch lengths of the copolymer from each of the samples. In the sample having no release agent on the wire the copolymer was difficult to remove and required a stripping tool for its removal.

As far as the other samples are concerned, the results were similar to those given in Example I containing the respective release agent with polyethylene. The sample containing ethylene oxide/propylene oxide copolymer release agent having a weight ratio of ethylene oxide to propylene oxide of about 1/1 was easily removed by hand. The sample containing the homopolymer of ethylene oxide required slightly more manual effort to remove the vulcanized ethylene-vinyl acetate copolymer and the sample containing the silicone release agent required more effort to release the vulcanized copolymer than was required with the two above-mentioned release agents. The sample coated with ethylene oxide/propylene oxide copolymer release agent having a weight ratio of ethylene oxide to propylene oxide of about 3/1 showed release characteristics approximately equivalent to those obtained with the silicone release agent.

I claim:

1. An electrically insulated conductor comprising:
   a. an electrical conductor having a release agent coated thereon, said release agent being a polymer of ethylene oxide, and
   b. cross-linked ethylene polymer insulation wherein the ethylene polymer was cross-linked on the said coated conductor.

2. An electrically insulated conductor as claimed in claim 1 wherein said release agent is one selected from the group consisting of a polyethylene oxide and a copolymer of ethylene oxide and propylene oxide.

3. An electrically insulated wire comprising:
   a. an electrically conductive wire having a release agent coated thereon, said release agent being one selected from the group consisting of polyethylene oxide having a molecular weight of from 570 to 630 and a copolymer of ethylene oxide and propylene oxide, with the weight ratio of ethylene oxide to propylene oxide being from 1/1 to 3/1 and
   b. cross-linked ethylene polymer insulation wherein the ethylene polymer was cross-linked on said coated wire.

4. An electrically insulated wire as claimed in claim 3 wherein said ethylene polymer is polyethylene having a density of from 0.915 to 0.945 grams/cc.

5. An electrically insulated wire as claimed in claim 4 wherein said ethylene polymer is polyethylene having a density of from 0.930 to 0.935 grams/cc.

6. An electrically insulated wire as claimed in claim 3 wherein said ethylene polymer is an interpolymer of ethylene and a vinyl monomer.

7. An electrically insulated wire as claimed in claim 6 wherein said ethylene polymer is an interpolymer containing from 80 to 95 weight percent of ethylene and from 5 to 20 weight percent of a vinyl monomer selected from the group consisting of vinyl acetate and ethyl acrylate.

8. An electrically insulated wire as claimed in claim 7 wherein said ethylene polymer is a copolymer of ethylene-vinyl acetate containing from 10 percent to 12 percent by weight of vinyl acetate.

* * * * *